(12) United States Patent
Hiller et al.

(10) Patent No.: US 9,369,672 B2
(45) Date of Patent: Jun. 14, 2016

(54) INTELLIGENT LAYOUTS FOR CALL SCALING AND LAYOUT PERSISTENCE

(71) Applicant: Polycom, Inc., San Jose, CA (US)

(72) Inventors: Everett Hiller, Austin, TX (US); Jim Darrah, Austin, TX (US); Jimmy Carter, Austin, TX (US); Satyanarayana Damisetti, Bangalore (IN); Simon Booth, Jersey City, NJ (US); Jesse Coleman, Austin, TX (US); Frank Lacombe, Austin, TX (US)

(73) Assignee: Polycom, Inc., San Jose, CA (US)

( * ) Notice: Subject to any disclaimer, the term of this patent is extended or adjusted under 35 U.S.C. 154(b) by 133 days.

(21) Appl. No.: 14/212,652

(22) Filed: Mar. 14, 2014

(65) Prior Publication Data

US 2014/0267576 A1    Sep. 18, 2014

Related U.S. Application Data

(60) Provisional application No. 61/784,518, filed on Mar. 14, 2013.

(51) Int. Cl.
*H04N 7/14* (2006.01)
*H04N 7/15* (2006.01)
*H04L 12/18* (2006.01)

(52) U.S. Cl.
CPC ............ *H04N 7/152* (2013.01); *H04L 12/1827* (2013.01)

(58) Field of Classification Search
CPC .................................................. H04L 12/1827
USPC ................... 348/14.01–14.16; 370/259–271, 370/351–357; 379/201.01, 202.01–207.01; 709/201–207, 217–248
See application file for complete search history.

(56) References Cited

U.S. PATENT DOCUMENTS

| 7,034,860 | B2 * | 4/2006 | Lia et al. ..................... 348/14.09 |
| 8,477,662 | B2 * | 7/2013 | Schneider ..................... 370/261 |
| 2007/0040900 | A1 * | 2/2007 | Castles ....................... 348/14.08 |
| 2011/0292161 | A1 * | 12/2011 | Sharon et al. .............. 348/14.07 |
| 2012/0127262 | A1 * | 5/2012 | Wu et al. .................... 348/14.09 |
| 2013/0093835 | A1 * | 4/2013 | Paithankar et al. ......... 348/14.07 |
| 2013/0335506 | A1 * | 12/2013 | Carter et al. ............... 348/14.07 |

* cited by examiner

*Primary Examiner* — Hemant Patel
(74) *Attorney, Agent, or Firm* — Blank Rome, LLP

(57) ABSTRACT

Disclosed herein are methods, systems, and techniques for creating media conferencing layouts that are intelligent (i.e., based on some underlying principle to enhance user-perceived conference quality) and persistent (i.e., consistent within a call and from one call to the next).

27 Claims, 8 Drawing Sheets

INTELLIGENT LAYOUTS FOR CALL SCALING AND LAYOUT PERSISTENCE

BACKGROUND

Videoconferencing entails exchange of audio, video, and other information between at least two participants. Generally, a videoconferencing endpoint at each participant location will include a camera for capturing images of the local participant and a display device for displaying images of remote participants. The videoconferencing endpoint can also include additional display devices for displaying digital content. In scenarios where more than two endpoints participate in a videoconferencing session, a multipoint control unit (MCU) can be used as a conference controlling entity. The MCU and endpoints typically communicate over a communication network, the MCU receiving and transmitting video, audio, and data channels from and to the endpoints.

FIG. 1 depicts an exemplary multipoint videoconferencing system 100. System 100 can include network 110, one or more multipoint control units (MCU) 106, and a plurality of endpoints 1-5 101-105. Network 110 can be, but is not limited to, a packet switched network, a circuit switched network, or a combination of the two. Endpoints 1-5 101-105 may send and receive both audio and video data. Communications over the network can be based on communication protocols such as H.320, H.324, H.323, SIP, etc., and may use compression standards such as H.263, H.264, etc. MCU 106 can initiate and manage videoconferencing sessions between two or more endpoints. Generally, MCU 106 can mix audio data received from one or more endpoints, generate mixed audio data, and send mixed audio data to appropriate endpoints. Additionally, MCU 106 can receive video streams from one or more endpoints. One or more of these video streams may be combined by the MCU 106 into combined video streams. Video streams, combined or otherwise, may be sent by the MCU 106 to appropriate endpoints to be displayed on their respective display screens. As an alternative, MCU 106 can be located at any one of the endpoints 1-5 101-105.

Combining the video streams is typically based on a specified layout. A layout can be specified for various states and configurations of the video call. For example, the near end display layout for a 2-way call can include the video streams of the only far end videoconferencing device; however, a 3-way video call near end display may include various permutations and combinations of the two far end video streams. Historically, the layouts generated by the MCU for various call scenarios have been either hard-coded into the software running the MCU or have been configured by a system administrator of the MCU. In some cases, a layout is maintained regardless of the roster count (number of sites on a call). In many cases, the admin configuration may be inconsistent with what a user would desire to see in a particular scenario. Historically, changes to the layouts have been cumbersome or impossible for a user to make.

Moreover, whatever user-configurable layout changes were available were not at all persistent, whether within a call, within calls made on the same device, or within calls made on different devices throughout a particular system, for example, all videoconferencing MCUs belonging to an organization. For example, users may have been able to configure certain layout variables such as dual monitor emulation (DME). Often this was done by toggling through existing layouts. Unfortunately, these selections would be lost when another site joined the call. Alternatively, in a bridge call, users might be able to use a far-end camera control feature or a touch screen to manually select the current layout, but it would not scale to the roster number. Additionally, whatever user-configurable layout parameters were available were device-specific, i.e., were stored locally only on the endpoint and/or MCU currently being used by the user. Thus, there has been no way for an admin to create a layout policy or for a user to have his layout preferences follow him from system to system.

SUMMARY

Disclosed herein are methods, systems, and techniques for creating media conferencing layouts that are intelligent (i.e., based on some underlying principle to enhance user-perceived conference quality) and persistent (i.e., consistent within a call and from one call to the next).

BRIEF DESCRIPTION OF THE DRAWINGS

Exemplary embodiments of the present invention will be more readily understood from reading the following description and by reference to the accompanying drawings, in which.

DETAILED DESCRIPTION

Figure 1:
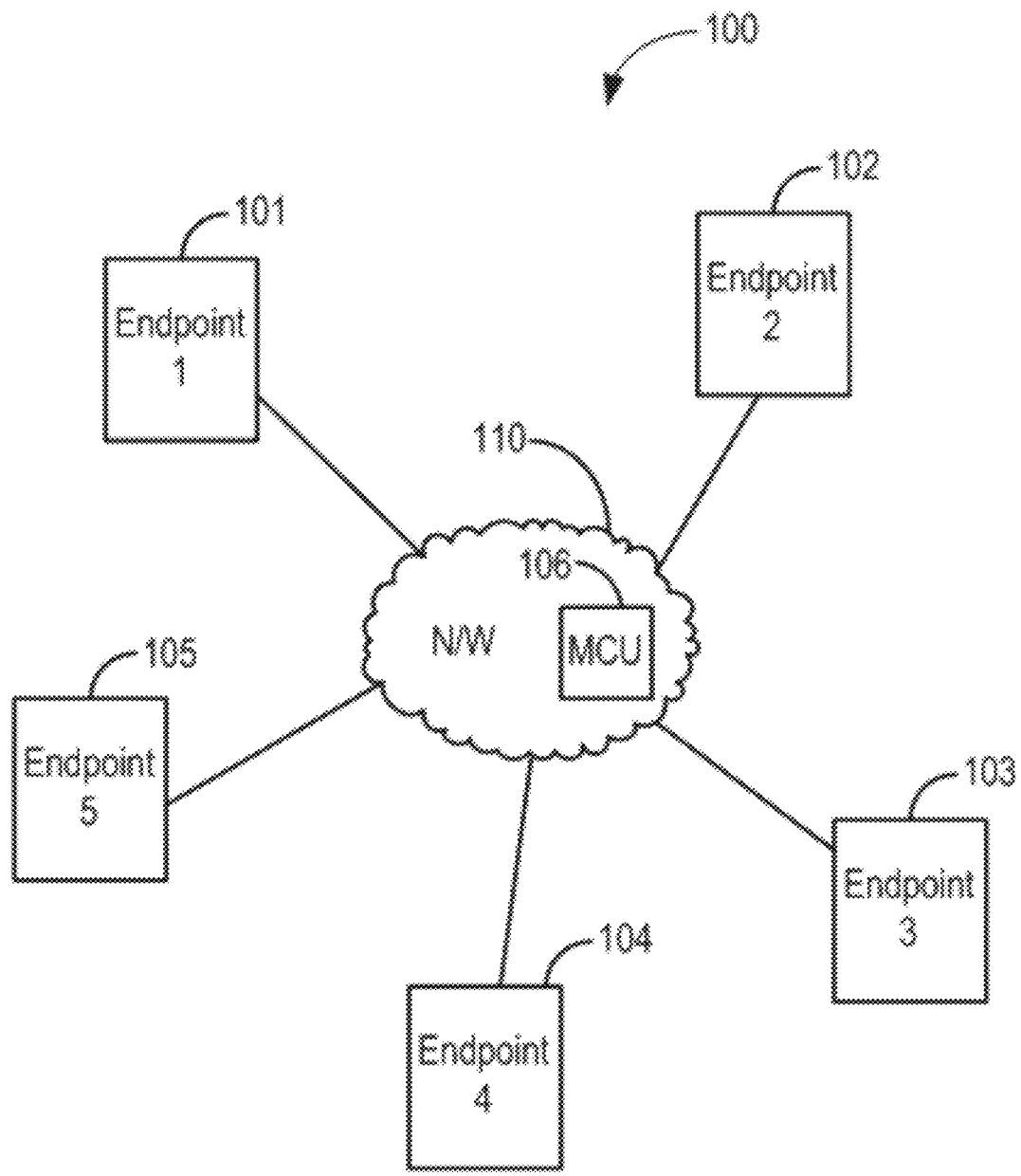
FIG. 1 illustrates an exemplary system in which various endpoints can communicate with each other and the multipoint control unit (MCU) over a communication network.
Figure 3:
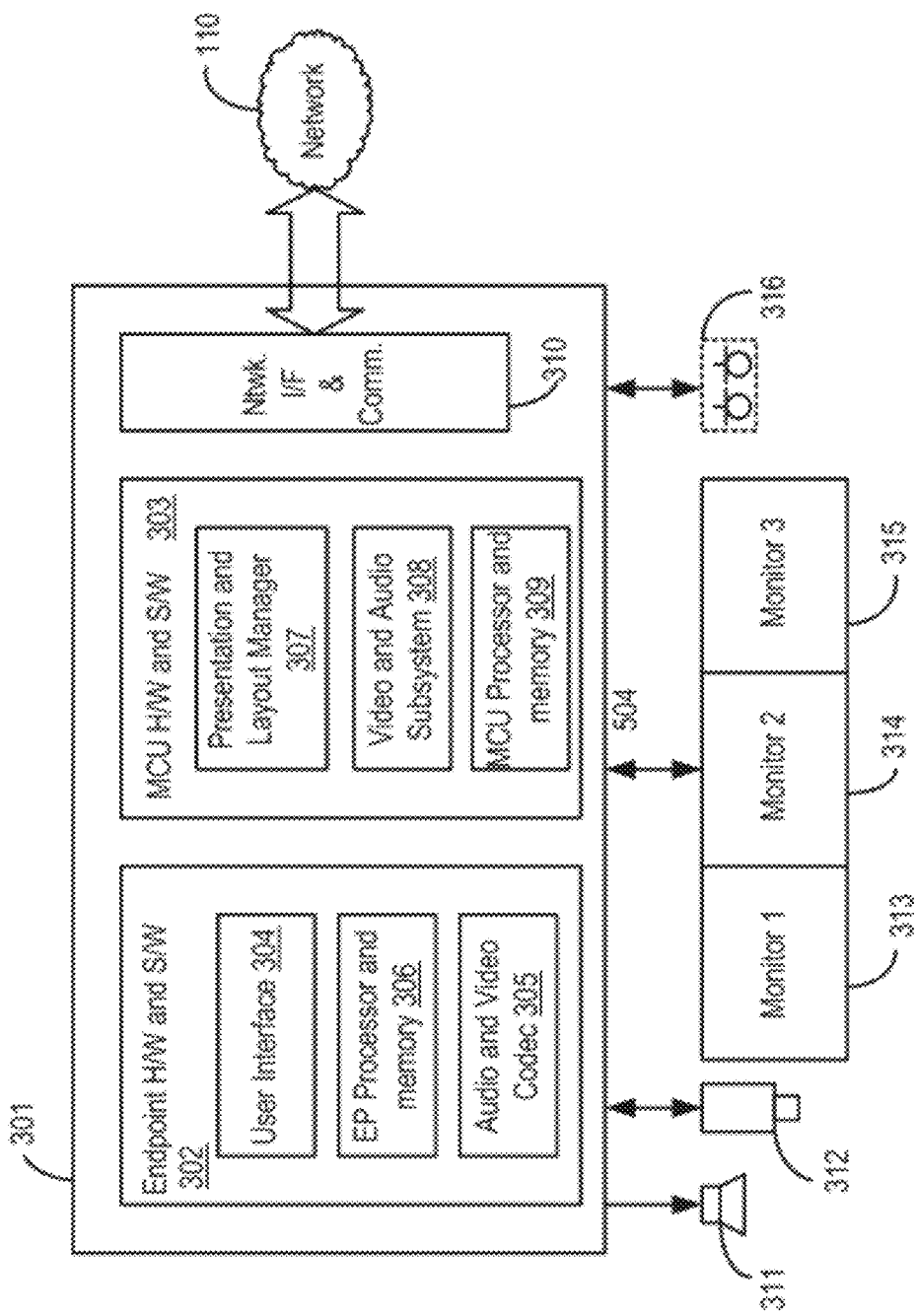
FIG. 3 illustrates an exemplary block diagram of an endpoint including an MCU.

FIG. 3 illustrates an exemplary block diagram of an endpoint 301, which includes a multipoint control unit MCU. Inclusion of an MCU allows the endpoint 301 to initiate, control, and maintain videoconferences in addition to performing the functionality of a typical videoconferencing endpoint. It is understood that the MCU portion of the endpoint 301 can be located outside the endpoint at the near end or across the network, as a standalone entity that communicates to all the endpoints (e.g., Endpoint 1-5 101-105 of FIG. 1) over the network.

The endpoint 301 can include and endpoint module 302, which, in turn, includes the necessary hardware and software associated with a typical videoconferencing endpoint. For example, the endpoint module 302 can include a user interface 304, which allows the user to input commands for controlling the operation of the endpoint module 302, or even the entire endpoint 301. The user interface 304 can include a keypad, keyboard, mouse, touchscreen, etc. and the associated software for accepting the user input. The user interface 304 can also include one or more displays, light emitting diodes (LEDs), etc., for providing status indications and other videoconferencing related data to the user. The user interface 304 can also provide such data visually on the monitors 313-315. The user interface 304 can communicate with an endpoint processor 306 to send user commands and receive user data to be communicated to the user.

The endpoint processor 306 can control the operation of various components of the endpoint 301 as well as control communications between the endpoint module 302 and the MCU 303 or other endpoints over the network 110. The end point processor 306 can be a microprocessor, microcontroller, a field programmable gate array (FPGA), an application specific integrated circuit (ASIC), or a combination thereof. The endpoint processor 306 can be coupled to a memory, which can be volatile (e.g., RAM) or non-volatile (e.g., ROM, FLASH, hard-disk drive, etc.). The memory can store all or a portion of the software and data associated with the endpoint module 302. The endpoint processor 306 can control the settings and orientation of the pan-tilt-zoom (PTZ) camera 311, the display settings of the monitors (Monitor 1 313, Monitor 2 314, and Monitor 3 315), the (one or more) speaker 311, and the microphone array 316.

The audio and video codec module 305 can include audio and video encoders and decoders as well as communication protocols. For example, the codec module 305 can include audio codecs such as MPEG, G.722, etc. and video codecs such as MPEG-4, H.264, etc. The audio codec can encode audio signals received from the microphone array 316 and generate audio streams and can decode audio streams received from the MCU module 303 or from the network 110 for reproduction by the speaker 311. The video codec can encode video frames captured by the camera 312 and generate video streams and can decode video streams received from the MCU 303 or over the network for reproduction on the monitors 313-315. The audio and video streams generated by the codec 306 can be communicated to the MCU module 303 or to far end endpoints and MCUs over the network 110. Communication over the network can be carried out via the network interface and communication module 310.

As mentioned above, the MCU module 303 can initiate, control, and maintain videoconference sessions that can include the near end endpoint 301 and far end endpoints over the network 110. The MCU module 303 can include various components as described in the H.323 specification, which is incorporated by reference in its entirety, and are not described further. The MCU module 303 can also include a presentation and layout manager 307, which is responsible for deciding how video images related to a video conferencing session are presented to far end endpoints to the near end endpoint 301 on monitors 313-315. As discussed in further detail below, the presentation and layout module 307 bases its decisions on various videoconferencing state and configuration changes, external commands, and external definition files.

The video and audio subsystem 308 receives data and instructions from the presentation module 307 and carries out audio and video mixing to generate audio and video streams that are sent to various far end and near end endpoints. The subsystem 308 can include various audio and video codecs for encoding and decoding audio and video streams received from various endpoints participating in a videoconferencing session.

The MCU processor 309 can control the operations of the MCU module 303. However, the MCU processor 309 can also include the functionality of the EP processor 306 for controlling the various components of the endpoint 301. As such, the MCU processor 309 and the EP processor 306 can be implemented on the same processor. The MCU processor 309 can also communicate with the user interface 304 to receive MCU related commands from the user, and present MCU related indications and data to the user.

Figure 2A:
FIGS. 2A-2D illustrate various conferencing layouts.

Operation details of Presentation and Layout Manager 307 will now be described, with particular reference to a new technique for layout management and persistence. However, before doing so, it is useful to describe the various elements that make up a layout. A first element that makes up a layout is illustrated in FIG. 2A. This element is the self-view or picture in picture. This element shows the local camera view to the local participant.

Figure 2B:
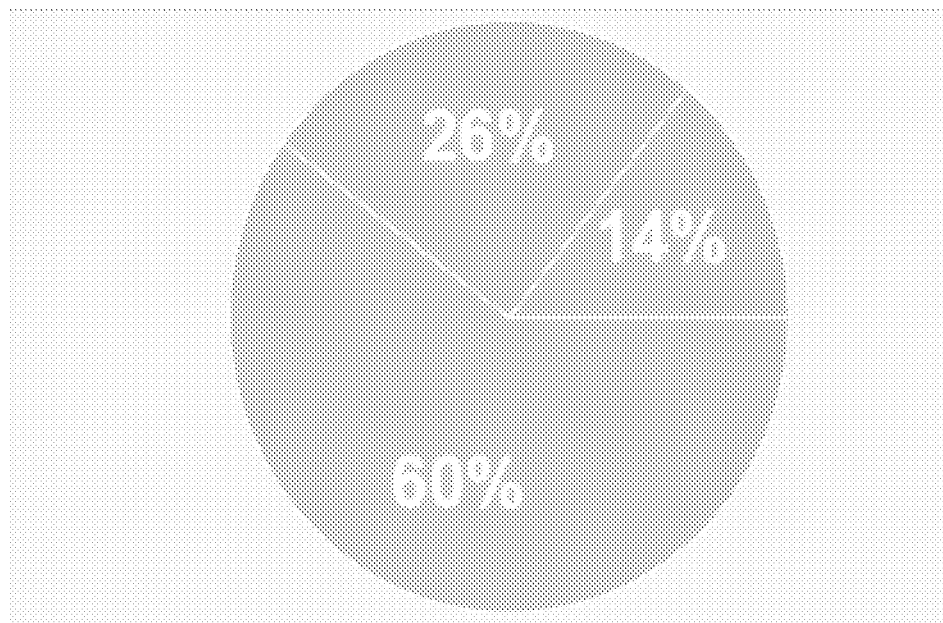

A second element that can make up the layout is a content view, illustrated in FIG. 2B. Content can include any variety of items that are not live people video. For example, content can be a shared document, such as a presentation, spreadsheet, etc. that is shown from a computer connected to the conferencing system. Additionally, content could be a view from a document camera. Some videoconferencing systems also include facilities to allow content to be shown from a USB memory device or other storage device connected to the conferencing system. In some cases, the content view can replace the self view and swap itself with the self view. This will be more readily understood in conjunction with the various layouts described below.

Figure 2C:
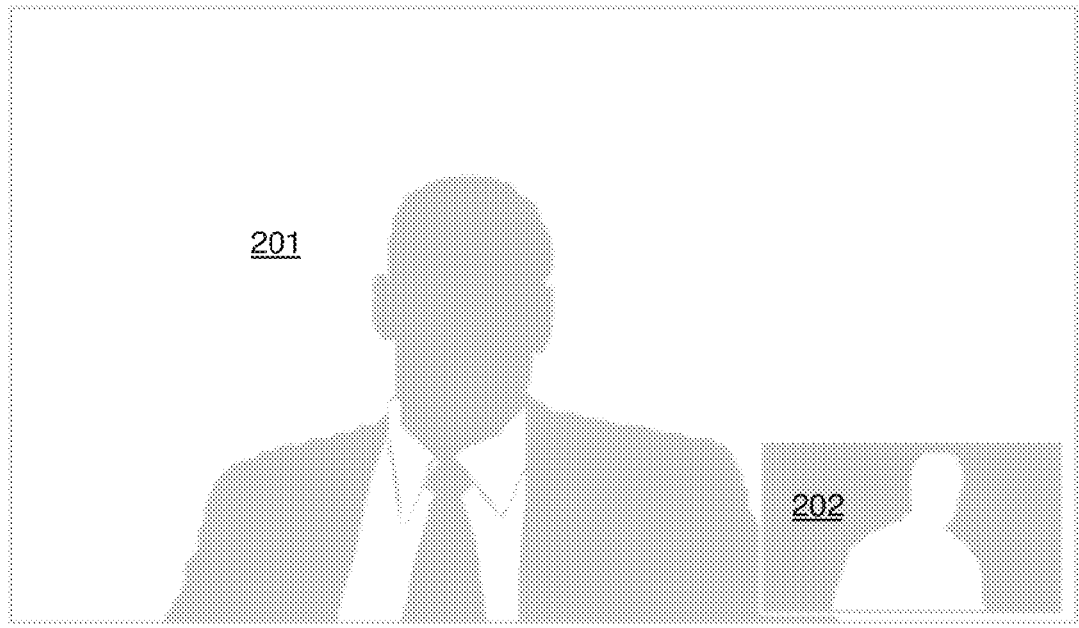
Figure 2D:
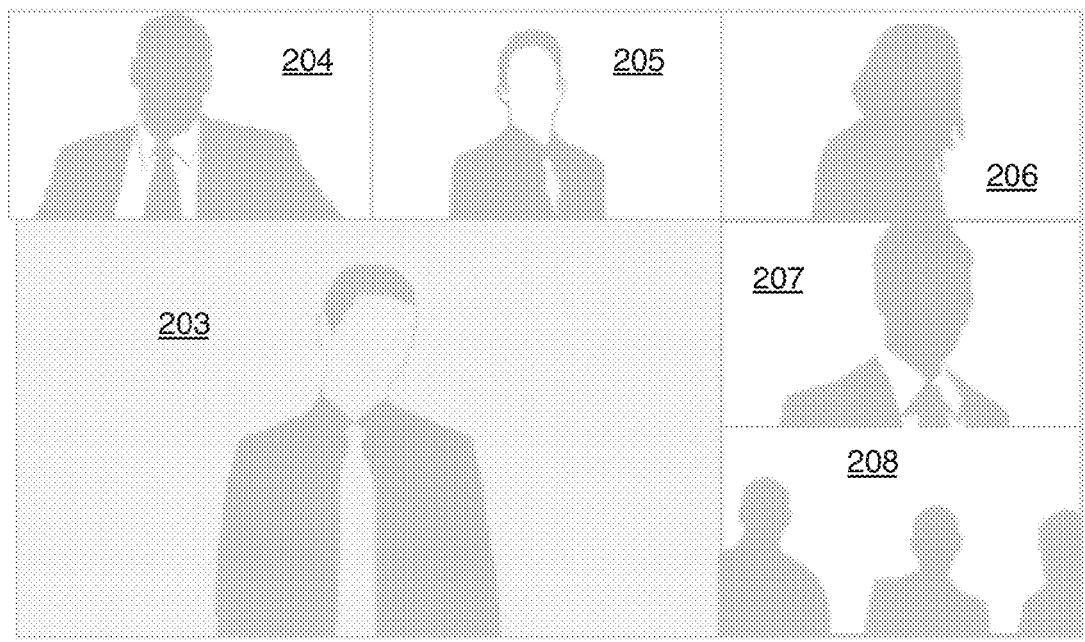

FIG. 2C illustrates a typical layout for a point-to-point call, i.e., a call with two participants whose videoconferencing terminals are directly connected. The video of a remote participant is illustrated in the main window 201, with the self view illustrated as a picture-in-picture view 202 in the lower right portion of the remote participant view. FIG. 2D illustrates a typical layout for a multi-point call, i.e., a call with more than two participants connected via a multipoint control unit (MCU). The MCU can either be part of one of the participant endpoints or can be a separate device. In the example of FIG. 2D, six remote and one local participant (not shown) are on the call. In one embodiment the active speaker (i.e., the speaker who is currently talking) can be illustrated in a larger window 203, while the other participants are illustrated in a plurality of smaller windows 204-208. In some embodiments, the active speaker can also be highlighted, illustrated conceptually by the light shading of the background of active speaker view 203. Other forms of highlighting, such as colored frames, etc. can also be used.

The various display elements referenced above can be advantageously combined in a variety of ways to present useful displays for a variety of conferencing scenarios. Preferably, conferencing and layout manager 307 can implement a variety of rules to provide consistency to the user experience. One exemplary set of rules is as follows:

Rule 1: Layouts are persistent over call scenarios. Thus, each time the user changes a layout for a certain number of endpoints in the call, the next time the user is in a call with the same number of endpoints, the same layout will be used. As an example, if a user is on a three way call and a fourth participant joins, then the layout will change to the layout used in the last four-way call.

Rule 2: Rule 1 is followed only up to the number of displayable sites given the current monitor configuration. Each monitor configuration has a maximum number of sites that it can display. For example, a single monitor system may be limited to displaying four remote sites, while a dual monitor system may be limited to displaying five remote sites and a three-monitor system may be limited to six remote sites. Other limits are also possible. Additionally, the MCU may composite the video streams from a multiple sites into a single stream that can be treated as one remote site by the displaying endpoint. These techniques are generally known in the art and will not be discussed in detail herein.

Rule 3: There are two layout tracks or "styles." These are described herein as "full screen" and "dual monitor emulation" (DME). It is to be understood that DME mode can also include multi-monitor emulation for emulation of more than three monitors. In some embodiments, the system can remain on a given track or style within a call. Thus, for example, if the user is in a three way DME call, and a fourth participant joins the conference, the system can go to a four way DME layout (as opposed to a single monitor four way layout).

Rule 4: The self view (discussed above) is persistent regardless of the number of sites on the call. Thus, for example, if a two way call with self view enabled is joined by a third participant, the self view remains enabled. Similarly, self view can be persistent from call to call. Thus, if self view is on and in a predetermined position in one call, it will be in the same position during the next call.

Figure 4:
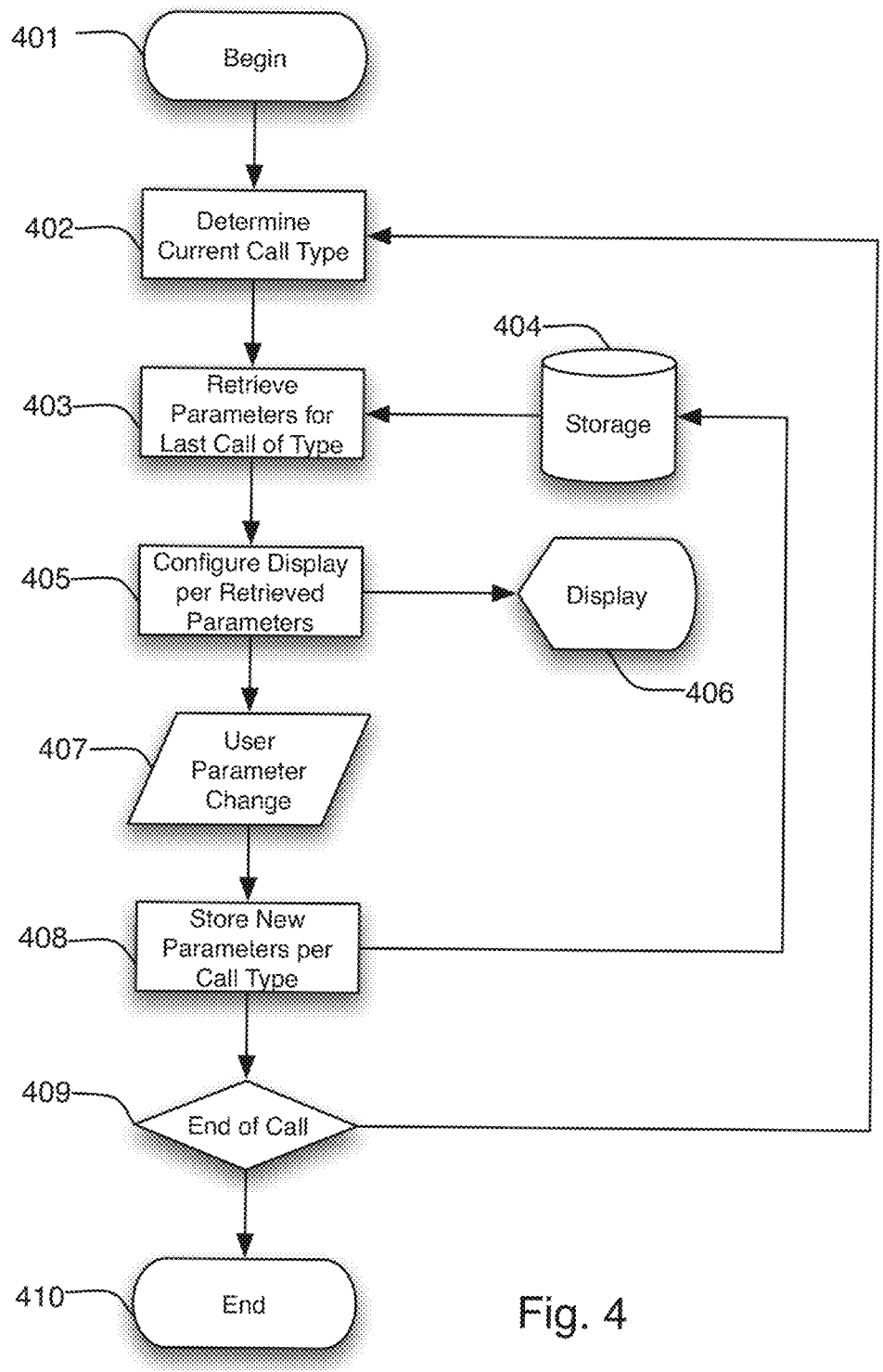
FIG. 4 illustrates a flowchart of an automated layout technique.

A flowchart for implementing these rules to create persistent layouts for a user is illustrated in FIG. 4. The process begins at step 401, which can coincide with call initiation. At that point the system can determine the current call type (402). This can include whether it is a point-to-point or multipoint call, the number of participants, whether dual monitor emulation (or multi-monitor emulation) is in use, etc. Once the call type is determined, the parameters for the last call of that type can be retrieved (403) from storage 404. These retrieved parameters are then used (405) to configure a layout for a display 406. The system can then check for a parameter change from the user (407). This might include any variety of setting changes, such as toggling the self view on and off, changing the location of the self view (see FIG. 5), etc. If there has been a user driven change of parameter, the new parameters for the current call type can be stored (408) in storage 404. The system can then determine whether the call has ended (404). If so, then the call ends (410), if not, the process can repeat with determining the current call type (402). The call type may change during the call, for example, if a new participant joins or drops off the call, or if content is now being presented (or not), etc.

Figure 5:
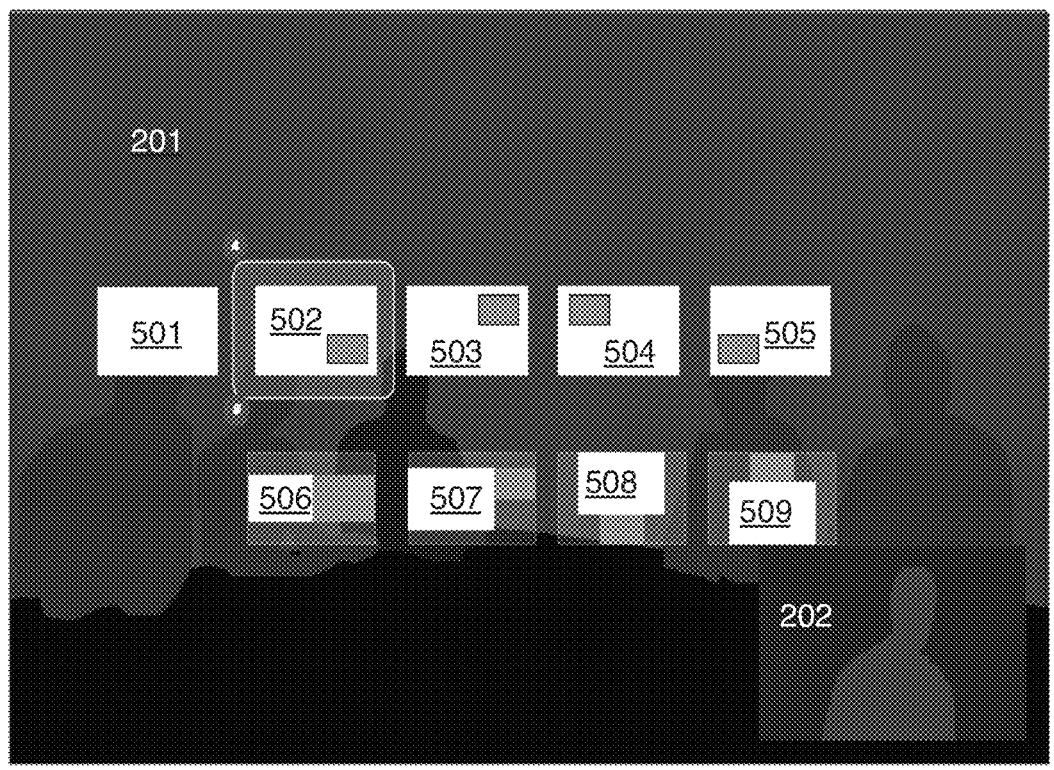
FIGS. 5-8 illustrate various conference layout parameter selection menus and associated conferencing layouts.

FIG. 5 illustrates conceptually a user toggle menu for self view state. There are a plurality of choices 501-509. Options 501-505 are what are known as full screen views. These views include self view off (501), bottom right (502), top right (503), and top left (504). Options 506-509 are what are known as dual monitor emulation (DME) or multi-monitor emulation modes. These include bottom left (505), side-by-side (506), side-by-side reduced (507), below reduced (508), and above reduced (509). Also note the selection box indicating the current mode which is picture-in-picture bottom left, as indicated in the conferencing screen in front of which the menu appears. Similar menus may be presented for other layout options as further described below.

Figure 6:
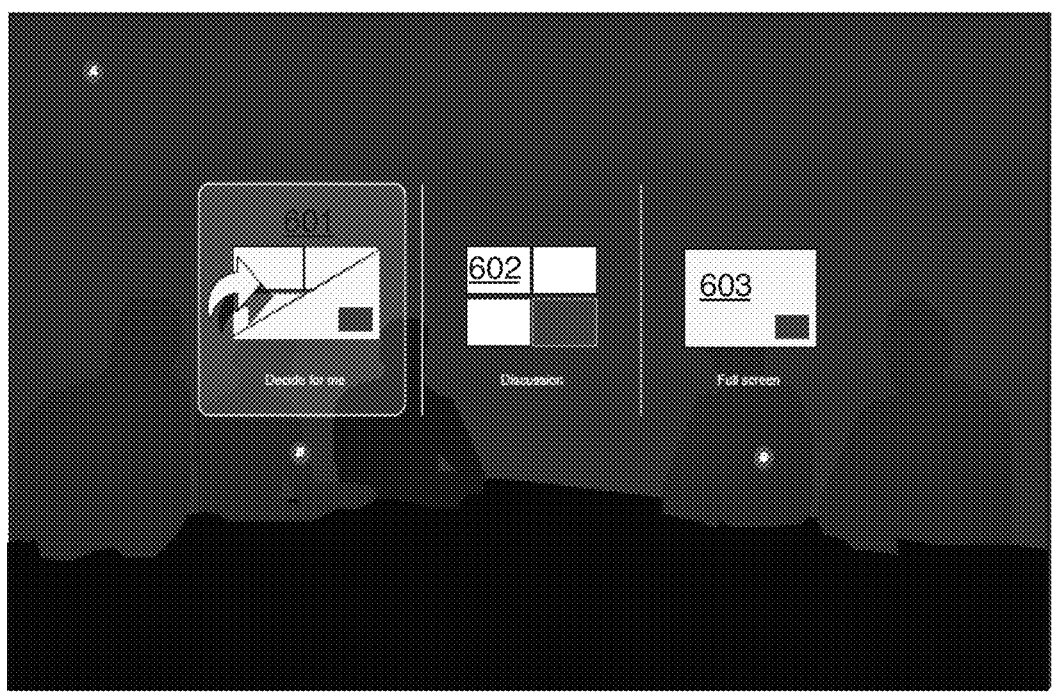

Another menu may be presented to a user allowing them to choose a layout or have the system choose a layout for them. One example of such a menu is illustrated in FIG. 6. The menu allows the user to select automatic layout mode 601 (in which the system will preselect a layout type based on rules like those described above). Alternatively, the user can select discussion mode 602, which shows all participants (up to the maximum number displayable) in separate regions of the screen in what is known as a "Hollywood Squares" layout. In this mode, the active speaker can be highlighted, or in variations of this mode, the active speaker may appear in a larger region. As yet another alternative, the user can select a full screen mode 603, in which the current speaker is displayed full screen, with the optional self view shown or not (as selected using a menu like that of FIG. 5.)

Figure 7A:
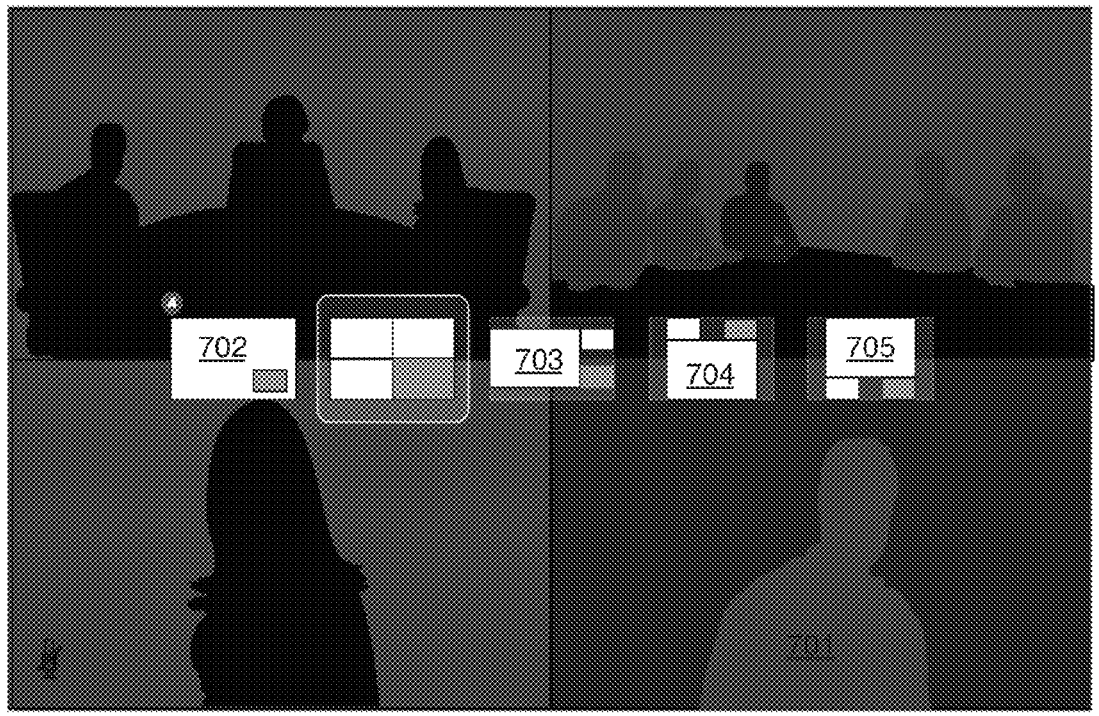
Figure 7B:
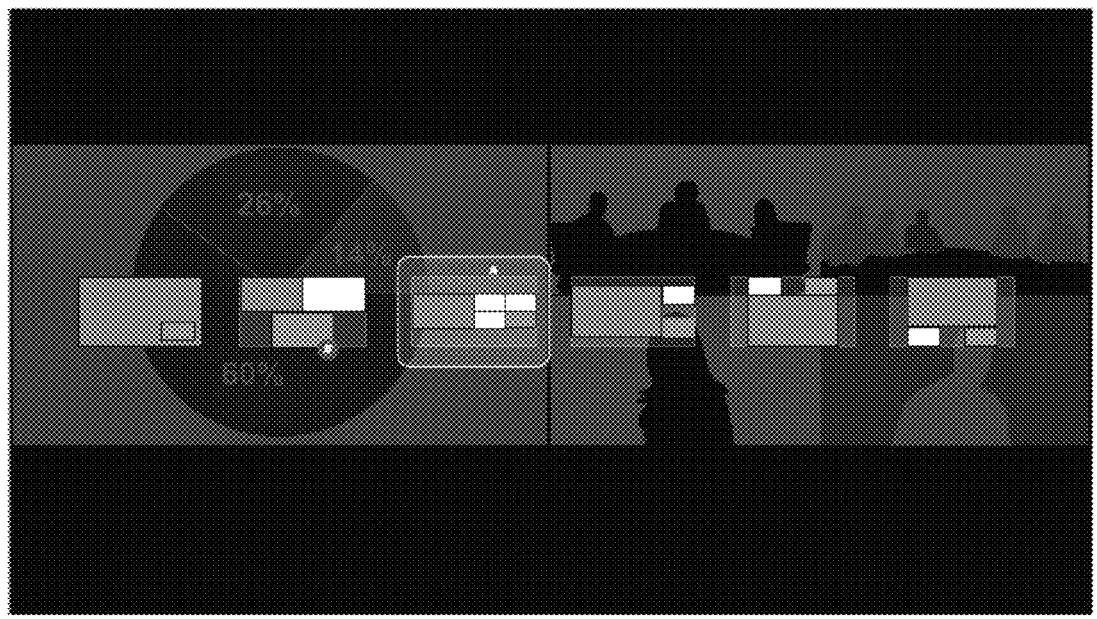

Numerous other combinations of these view elements are possible. Without limitation some of these various views are illustrated in FIGS. 7A-7B. For example, FIG. 7A represents a four site, full screen, no content view, with self view enabled. The self view 701 thus appears in one of the four regions. The overlaying menu for selecting various layouts includes full screen picture-in-picture (702), the currently selected view of full screen with self view, and various multi monitor emulation modes in which the self view and non-active speakers are presented in various positions relative to the active speaker in the larger window (703-705). FIG. 7B illustrates a selection of four person call arrangement but with content.

Figure 8:
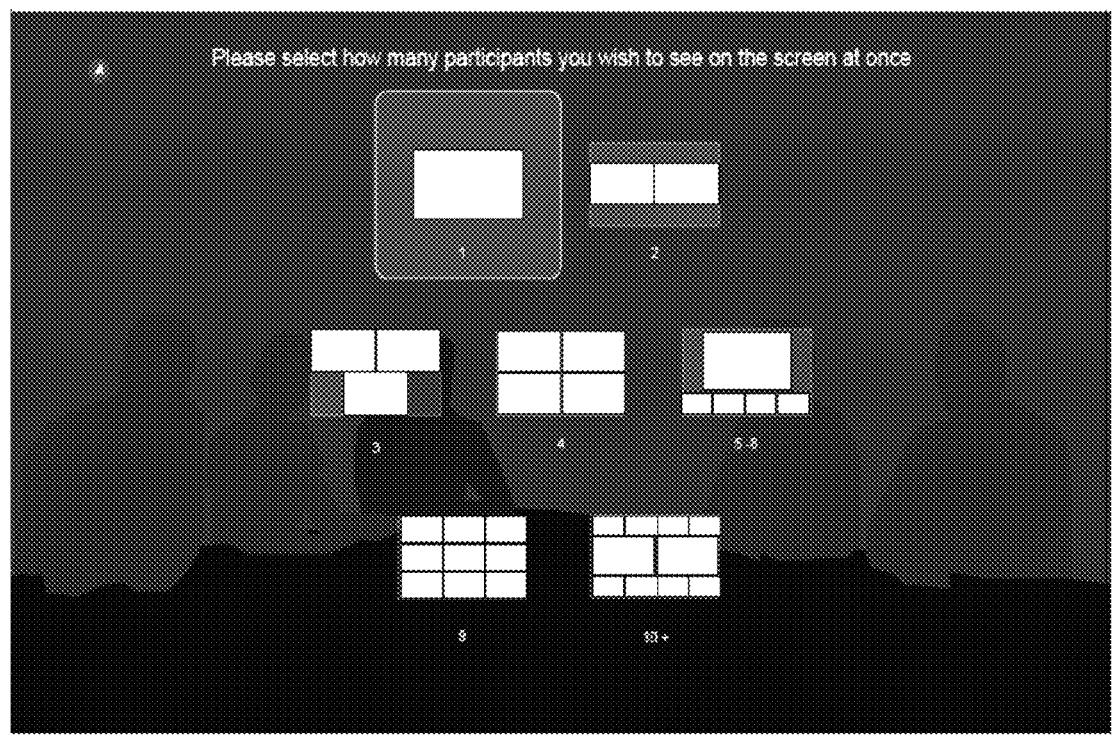

As the number of participants increases, the display arrangements become somewhat more complicated, but the same principles apply. As alluded to above, most videoconferencing endpoints have a maximum number of separate conference streams that can be displayed on a given display. However, for calls involving more participants, an MCU can composite multiple endpoints' streams into a single stream, thereby overcoming this limitation. Historically, these settings have been configured by an administrator of the MCU and were not typically accessible by users connected to the MCU. However, in accordance with the systems described herein, a menu, such as that illustrated in FIG. 8 may be presented to the user, which allows the user to tell the MCU how many sites he would like to view (based on compositing done by the MCU). As can be seen, increasingly large numbers of sites can be displayed, even on a single monitor, by judicious arrangement in the compositing process.

In addition to persistently arranging the layouts based on rules like those discussed above, layout rules may also be specified based on the "role" of the stream in a conference. The role may be included as part of an identifier of a stream. Roles may include such items as whether the steam is live people video or content. Additionally, people or content streams may be identified as various different types, such as presenter, active speaker, passive participant, etc. These roles may be permanent, semi-permanent (i.e., unchanging for the duration of a call), or may change during the call.

As one example, during a CEO presentation or a remote instruction scenario, it might be desirable for the CEO's or teacher's endpoint to claim the "presenter" role so that their video is always displayed to all participants. Additionally content associated with the presenter could receive priority over other streams. Conversely, passive participants in those roles might not be displayed to remote participants. However, during a call if a participant has a question for the presenter, that passive participant stream might be denoted as active speaker so that other participants could see who was asking a question of the nominal presenter. Any number of roles and rules based on those roles can be defined based on the needs of a particular conferencing system.

In addition to the foregoing, roles (and rules based thereon) can be assigned not just to media streams, but also to monitors. For example, a particular monitor could be assigned a role as the content displaying monitor or as only a people-displaying monitor. One or both of those scenarios might be applicable to a telepresence room, which as dedicated content monitors and in which displaying content on the people monitors might be disruptive to the telepresence experience. Such might not be true in the case of a small group room, in which the monitors of necessity do double duty.

Additionally, roles (and rules based thereon) might be assigned on an enterprise basis, e.g., the CEO might always have priority in all calls. Alternatively, roles and associated rules might be changeable on a call-to-call basis. In some instances, it may be desirable to present the user with a choice as to whether or not the default enterprise role should be changed for the present call. Additional information on role-based media stream, layout, and conference management can be found in provisional patent application Ser. No. 13/918, 226, filed Jun. 14, 2013, entitled "Layout and Presentation Manager for a Videoconferencing Multipoint Control Unit," which is hereby incorporated by reference in its entirety.

The data and rules for the layout preferences can be stored in one or more data files that can be created and/or modified by an administrator or by the user. In some embodiments, an administrator can create a default layout preference file (or files) that can be distributed to users and modified by those users, if so desired. In some embodiments, such files can be downloaded, and distributed across multiple systems and multiple platforms. This can allow a user to retrieve his preferences when using new equipment within the organization. If a user can login or check-in to a system, layout preferences can be associated with that user and can be automatically retrieved upon said log in or check-in. Future logins or check-ins can automatically retrieve the preferences either from a last used MCU or from some other centralized server.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method of establishing persistent, intelligent video layouts, executed by a multipoint control unit operatively coupled to two or more endpoints in a videoconference, the method comprising:
   determining by a presentation and layout manager of the multipoint control unit a call type of a current call;
   retrieving layout parameters of a last call having a same type as the current call from a storage medium associated with the multipoint control unit, at least one of the layout parameters having been previously changed during the last call; and
   providing by the presentation and layout manager to at least one of the endpoints display configuration instructions according to the retrieved parameters.

2. The method of claim 1 wherein call type includes whether the call is a point-to-point or multipoint call, a number of participants on the call, and whether multi monitor emulation is in use for one or more endpoints on the call.

3. The method of claim 1 wherein the layout parameters include one or more items selected from the group consisting of: whether a self view is on or off, a location of the self view, multi monitor emulation, discussion mode, and full screen mode.

4. The method of claim 1 further comprising:
   providing by the presentation and layout manager to the at least one of the endpoints instructions to cause the endpoint to present a user interface presenting one or more options for layout parameters to a user located at the endpoint;
   receiving by the presentation and layout manager from the user one or more layout parameter changes;
   storing by the presentation and layout manager the one or more layout parameter changes in the storage medium associated with the multipoint control unit; and
   providing by the presentation and layout manager to the endpoint display configuration instructions according to the layout parameter changes.

5. The method of claim 4 wherein the one or more options for layout parameters include whether a self view is on or off and a location of the self view.

6. The method of claim 4 wherein the one or more options for layout parameters include whether multi monitor emulation is to be used.

7. The method of claim 4 wherein the one or more options for layout parameters include whether a discussion mode or a full screen mode is to be used.

8. The method of claim 4 wherein the one or more options for layout parameters include whether the MCU is to composite video streams from a plurality of endpoints into a single stream.

9. The method of claim 1 further comprising:
   determining by the presentation and layout manager of the multipoint control unit whether the call type of the current call has changed; and
   if the call type has changed, providing by the presentation and layout manager to the at least one of the endpoints display configuration instructions according to the change in call type.

10. The method of claim 1 wherein the multipoint control unit is integrated with one of the one or more endpoints.

11. A videoconferencing device comprising:
    an endpoint module comprising endpoint hardware and software;
    interfaces for at least one camera, at least one microphone, at least one speaker, and one or more displays operatively coupled to the endpoint module; and
    a multipoint control unit module operatively coupled to the endpoint module and to a network interface, the multipoint control unit module comprising multipoint control unit hardware and software, the multipoint control unit hardware and software including a presentation and layout manager configured to:
    determine a call type of a current call;
    retrieve layout parameters of a last call having a same type as the current call from a storage medium associated with the multipoint control unit, at least one of the layout parameters having been previously changed during the last call; and
    provide to the endpoint module display configuration instructions according to the retrieved parameters.

12. The videoconferencing device of claim 11 wherein call type includes whether the call is a point-to-point or multipoint call.

13. The videoconferencing device of claim 11 wherein call type includes a number of participants on the call.

14. The videoconferencing device of claim 11 wherein call type includes whether multi monitor emulation is in use for one or more endpoints on the call.

15. The videoconferencing device of claim 11 wherein the layout parameters include one or more items selected from the group consisting of: whether a self view is on or off, a location of the self view, multi monitor emulation, discussion mode, and full screen mode.

16. The videoconferencing device of claim 11 wherein the presentation and layout manager is further configured to:
    provide to the endpoint module instructions to present a user interface of one or more options for layout parameters to a user;
    receive from the user one or more layout parameter changes;
    store the received one or more layout parameter changes in the storage medium associated with the multipoint control unit; and
    providing by the presentation and layout manager to the endpoint display configuration instructions according to the layout parameter changes.

17. The videoconferencing device of claim 16 wherein the one or more options for layout parameters include whether a self view is on or off and a location of the self view.

18. The videoconferencing device of claim 16 wherein the one or more options for layout parameters include whether multi monitor emulation is to be used.

19. The videoconferencing device of claim 16 wherein the one or more options for layout parameters include whether a discussion mode or a full screen mode is to be used.

20. The videoconferencing device of claim 16 wherein the one or more options for layout parameters include whether the MCU is to composite video streams from a plurality of endpoints into a single stream.

21. The videoconferencing device of claim 11 wherein the presentation and layout manager is further configured to:
   determine whether the call type of the current call has changed; and
   if the call type has changed, provide display configuration instructions according to the change in call type to the endpoint module.

22. A multipoint control unit for videoconferencing configured to be operatively coupled to two or more endpoints in a video conference, the multipoint control unit including a presentation and layout manager configured to:
   determine a call type of a current call;
   retrieve layout parameters of a last call having a same type as the current call from a storage medium associated with the multipoint control unit, at least one of the parameters having been previously changed during the last call; and
   provide to at least one of the two or more endpoints display configuration instructions according to the retrieved parameters and according to a role of each of a plurality of media streams in the video conference;
   determine, during the video conference, whether the call type of the current call has changed; and
   if the call type has changed, provide display configuration instructions according to the change in call type to the endpoint module.

23. The multipoint control unit of claim 22 wherein the role is included as part of an identifier of each of the plurality of media streams.

24. The multipoint control unit of claim 22 wherein the role is permanent.

25. The multipoint control unit of claim 22 wherein the role is permanent only for the duration of the video conference.

26. The multipoint control unit of claim 22 wherein the role can change during the duration of the video conference.

27. The multipoint control unit of claim 22 wherein the presentation and layout manager is further configured to provide to the at least one of the two or more endpoints display configuration instructions according to an assigned role of one or more displays associated with the at least one of the two or more endpoints.

* * * * *